(12) United States Patent
Chiu et al.

(10) Patent No.: US 8,599,548 B2
(45) Date of Patent: Dec. 3, 2013

(54) MOUNTING APPARATUS FOR PCI CARD BRACKET

(75) Inventors: Po-Wen Chiu, New Taipei (TW); Wen-Hu Lu, Shenzhen (CN); Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 265 days.

(21) Appl. No.: 13/245,245

(22) Filed: Sep. 26, 2011

(65) Prior Publication Data

US 2012/0160978 A1   Jun. 28, 2012

(30) Foreign Application Priority Data

Dec. 24, 2010  (CN) .......................... 2010 1 06044505

(51) Int. Cl.
  *G06F 1/16*   (2006.01)
  *H05K 7/14*   (2006.01)
  *H05K 7/02*   (2006.01)

(52) U.S. Cl.
  USPC ................. 361/679.32; 361/679.31; 361/809; 361/801

(58) Field of Classification Search
  USPC ....................... 361/679.31, 679.32, 801, 802, 361/807–810, 752, 790, 747, 759
  See application file for complete search history.

(56) References Cited

U.S. PATENT DOCUMENTS

| 6,118,668 | A * | 9/2000 | Scholder et al. ............... 361/753 |
| 6,215,667 | B1 * | 4/2001 | Ady et al. ...................... 361/752 |
| 7,593,239 | B2 * | 9/2009 | Li et al. ........................... 361/807 |
| 2006/0232952 | A1* | 10/2006 | Peng et al. ..................... 361/796 |
| 2008/0298030 | A1* | 12/2008 | Fan et al. ....................... 361/759 |

* cited by examiner

*Primary Examiner* — Zachary M Pape
*Assistant Examiner* — Nidhi Desai
(74) *Attorney, Agent, or Firm* — Altis & Wispro Law Group, Inc.

(57) ABSTRACT

A mounting apparatus includes a chassis, a first fastener, a bracket, and a second fastener. The chassis includes a bottom plate. The first fastener is secured to the bottom plate and defines a through hole and a positioning slot in the inner wall of the through hole. The bracket configured for securing PCI cards. A securing piece is located on the bracket and placed on the first fastener. A securing hole is defined in the securing piece and aligned with the through hole. The second fastener includes a base portion and a blocking portion. The base portion is engaged in the securing hole and the through hole. The securing piece is positioned between the blocking portion and the first fastener. A positioning portion is located on the base portion and engaged in the positioning slot.

19 Claims, 5 Drawing Sheets

MOUNTING APPARATUS FOR PCI CARD BRACKET

BACKGROUND

1. Technical Field

The present disclosure relates to a mounting apparatus for a peripheral component interconnect (PCI) card bracket.

2. Description of Related Art

A bracket is provided in computer system for securing PCI cards. The bracket is usually directly secured to a chassis of the computer system with screws, which makes assembly and disassembly of the bracket inconvenient. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
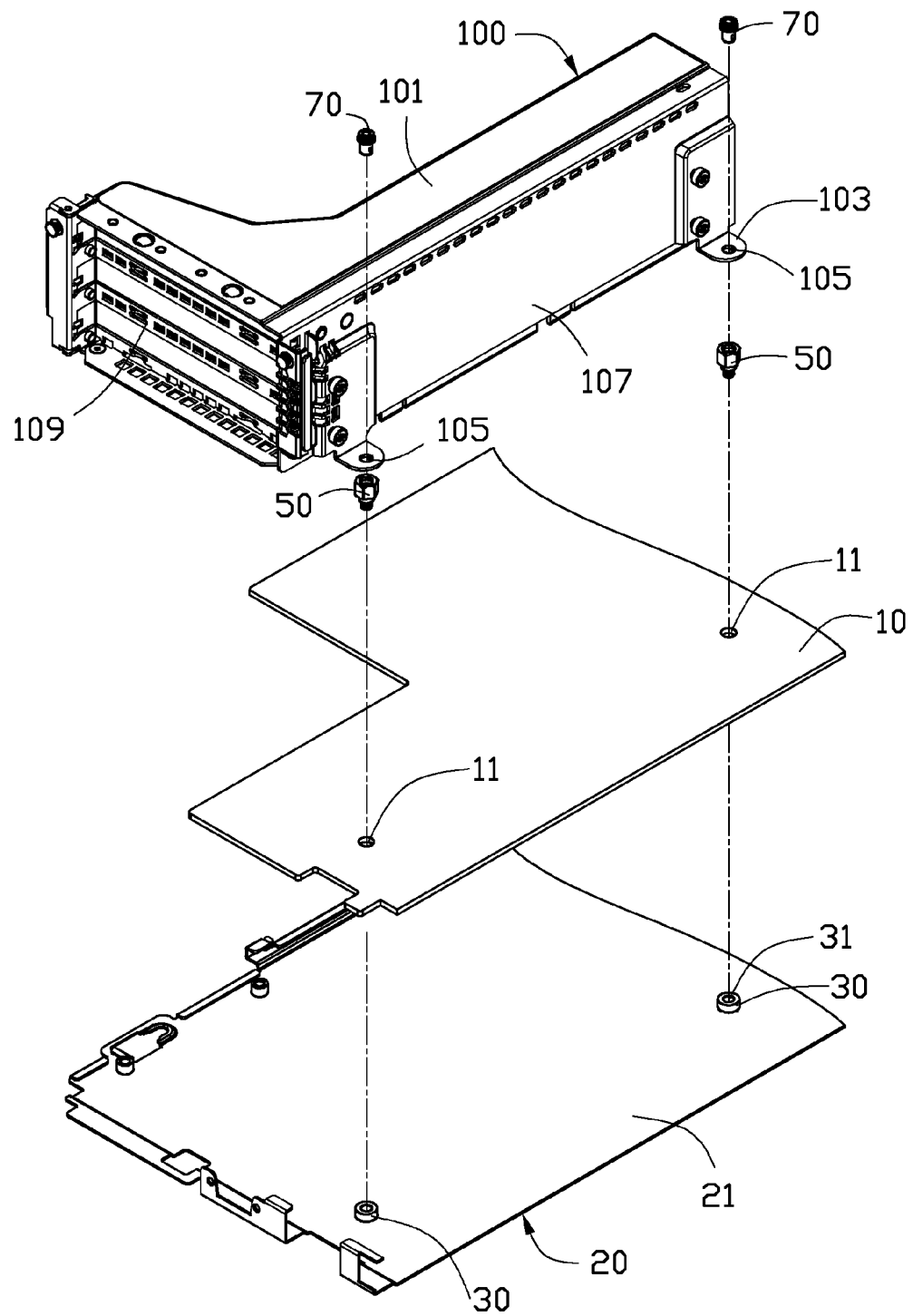
FIG. 1 is an exploded, isometric view of a mounting apparatus and a circuit board in accordance with an embodiment.

Referring to FIG. 1, a mounting apparatus in accordance with an embodiment includes a chassis 20 (only a part shown in FIGS. 1, 4, and 5), a bracket 100, a first fastener 50, and a second fastener 70.

The chassis 20 includes a bottom plate 21. Three fixing members 30 are secured to the bottom plate 21. A fixing hole 31 is defined in each fixing member 30. In one embodiment, the fixing hole 31 is a threaded hole.

The bracket 100, configured for securing a plurality of PCI cards, includes a top wall 101, a first sidewall 107, and a second sidewall 109. The PCI cards may be, for example, sound cards, video cards, or graphics cards etc., for enhancing capabilities of a computer system. The first and second sidewalls 107, 109 are respectively located on adjacent edges of the top wall 101. Three securing pieces 103 (only two shown in FIGS. 1 and 4) are disposed on the bracket 100. In one embodiment, two of the three securing pieces 103 are located on the outer surface of the first sidewall 107 (see FIGS. 1 and 4), and another securing piece (not shown) is located on the second sidewall 109. A securing hole 105 is defined in each securing piece 103, corresponding to the fixing holes 31. In one embodiment, the top wall 101 is substantially perpendicular to the first and second sidewalls 107, 109, and the first sidewall 107 is substantially perpendicular to the second sidewall 109. In another embodiment, the securing pieces 103 are substantially perpendicular to the first and the second sidewalls 107, 109.

Figure 2:
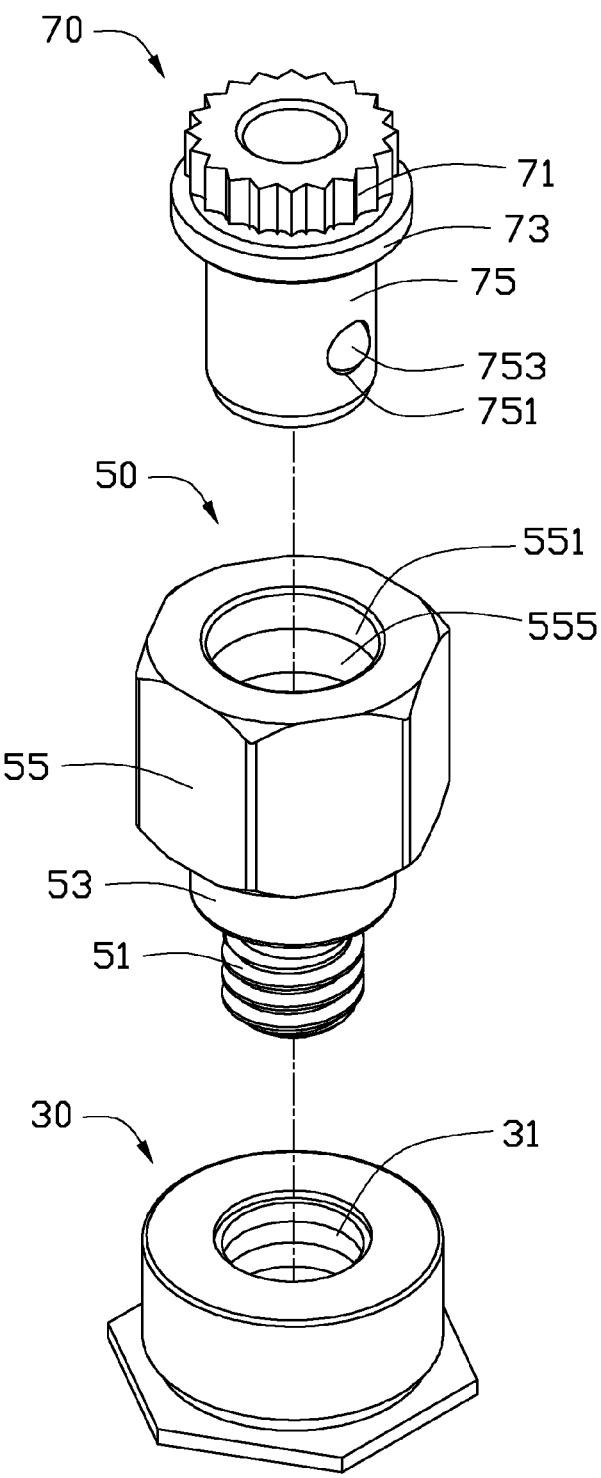
FIG. 2 is an isometric view of a fixing member, a first fastener and a second fastener of the mounting apparatus of FIG. 1.
Figure 3:
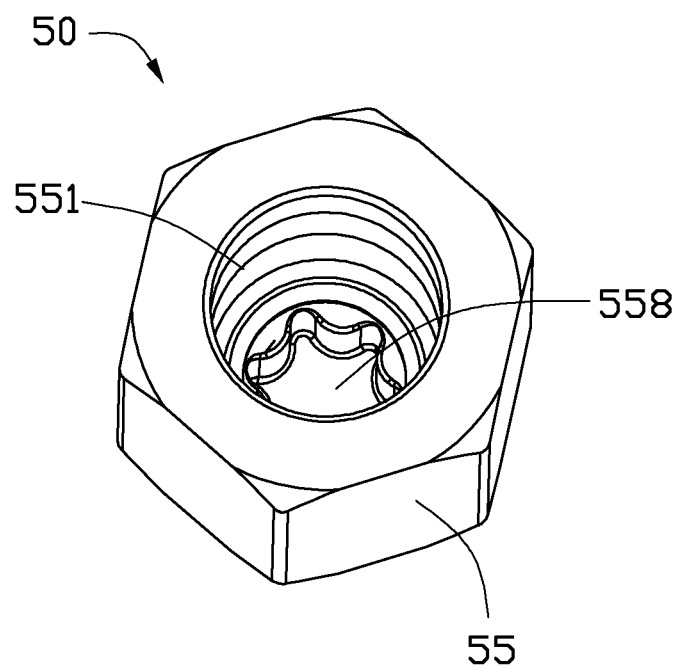
FIG. 3 is another isometric view of the first fastener of FIG. 2.

Referring to FIG. 2, the first fastener 50 includes a head portion 55, a neck portion 53, and a mounting portion 51. The neck portion 53 is connected between the head portion 55 and the mounting portion 51. A through hole 551 is defined in the head portion 55. The head portion 55 defines a positioning slot 555 (see FIGS. 2 and 5) in the inner wall of the through hole 551. The mounting portion 51 is configured to engage in the fixing hole 31 of the fixing member 30. In one embodiment, the mounting portion 51 is externally threaded. Referring to FIG. 3, the first fastener 50 defines a recess 558 in a bottom of the through hole 551. In one embodiment, the recess 558 has a plum-flower shape.

The second fastener 70 includes an operating portion 71, a blocking portion 73, and a base portion 75. The blocking portion 73 is connected between the operating portion 71 and the base portion 75. In one embodiment, a diameter of the blocking portion 73 is greater than that of the securing hole 105. Two receiving holes 751 are defined in the base portion 75, and two positioning portions 753 are correspondingly received in the receiving holes 751. Each positioning portion 753 is slidable between a first position, where the positioning portion 753 is fully received in the receiving hole 751, and a second position, where the positioning portion 753 extends out of the receiving hole 751. A resilient member 200 (shown in FIG. 5), such as a spring, received in the receiving holes 751, is resiliently deformed when the positioning portion 753 is slid from the second position to the first position and rebounds when the positioning portion 753 is slid from the first position to the second position.

Figure 4:
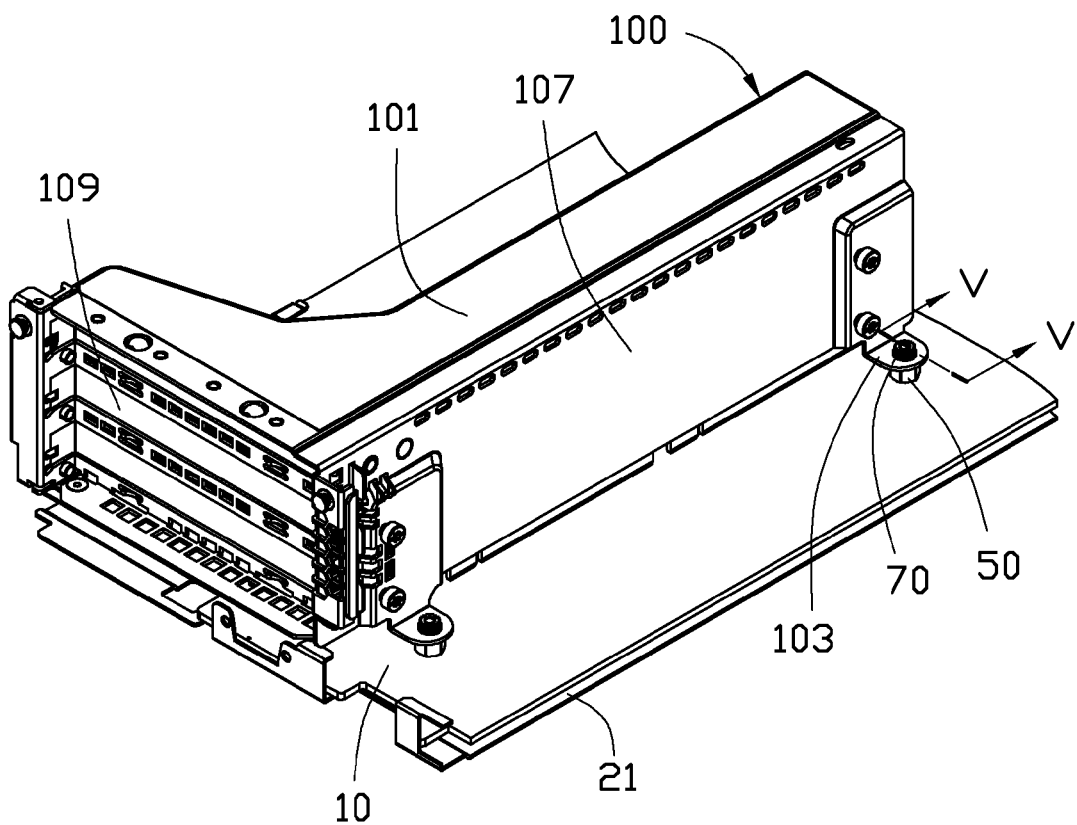
FIG. 4 is an assembled view of FIG. 1.
Figure 5:
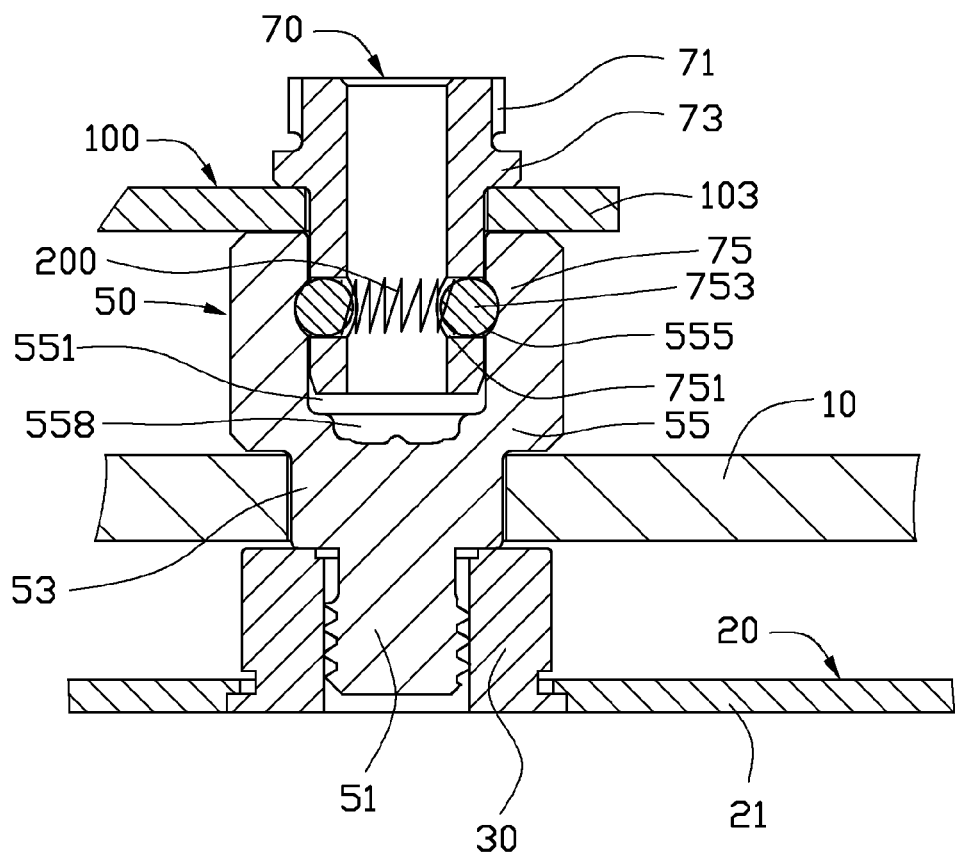
FIG. 5 is a cross-sectional view taken along the line V-V of FIG. 4.

Referring to FIGS. 4-5, the first fasteners 50 are configured for securing a circuit board 10. In one embodiment, the circuit board 10 is a motherboard. Referring to FIG. 1, two locking holes 11 are defined in the circuit board 10, corresponding to two of the fixing holes 31.

In assembly, the circuit board 10 is placed in the chassis 20 on the fixing members 30, and the locking holes 11 are aligned with the fixing holes 31. The first fasteners 50 are extended through the corresponding locking holes 11 to engage with the fixing holes 31. Therefore, the circuit board 10 is secured to the bottom plate 21. The bracket 100 is placed in the chassis 20 on the first fasteners 50. The securing pieces 103 are positioned on the first fasteners 50, and the securing holes 105 are aligned with the through holes 551. In one embodiment, the securing pieces 103 are substantially parallel to the bottom plate 21. The base portions 75 are inserted into the through holes 551 of the corresponding first fasteners 50. The positioning portions 753 are pressed by the inner wall of the through hole 551 and slid from the second position to the first position. When the positioning portions 753 are positioned corresponding to the positioning slot 555, the positioning portions 753 are slid from the first position to the second position to engage in the positioning slot 555. Therefore, the second fasteners 70 are secured to the corresponding first fasteners 50, and the bracket 100 is secured to the chassis 20.

In disassembly, the second fasteners 70 are pull away from the first fasteners 50. The positioning portions 753 are pressed by the inner wall of the through hole 551 and slid from the second position to the first position. When the positioning portions 753 are slid out of the positioning slot 555, the second fasteners 70 can be removed from the first fasteners 50. Therefore, the bracket 100 can be removed from the chassis 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising: a chassis comprising a bottom plate; a first fastener secured to the bottom plate, the first fastener defining a through hole and a positioning slot in an inner wall of the through hole; a bracket configured for securing PCI cards, a securing piece located on the bracket and placed on the first fastener, a securing hole defined in the securing piece and aligned with the through hole; and a second fastener comprising a base portion and a blocking portion, the base portion is engaged in the securing hole and the through hole, the securing piece positioned between the blocking portion and the first fastener, and a positioning portion located on the base portion and engaged in the positioning slot; wherein a receiving hole is defined in the base portion and the positioning portion is slidable in the receiving hole.

2. The mounting apparatus of claim 1, wherein a resilient member is received in the receiving hole, the positioning portion abuts the resilient member, and the resilient member is capable of sliding the positioning portion.

3. The mounting apparatus of claim 1, wherein a diameter of the blocking portion is greater than that of the securing hole.

4. The mounting apparatus of claim 1, wherein the first fastener defines a recess in a bottom of the through hole.

5. The mounting apparatus of claim 1, wherein the first fastener comprises a head portion, a neck portion and a mounting portion, the neck portion is connected between the head portion and the mounting portion, and the through hole is defined in the head portion.

6. The mounting apparatus of claim 5, wherein a diameter of the neck portion is greater than that of the mounting portion, but less than that of the head portion.

7. The mounting apparatus of claim 5, wherein a fixing member is secured to the bottom plate, the mounting portion is fixed in the fixing member, and a circuit board is mounted between the head portion and the fixing member.

8. The mounting apparatus of claim 1, wherein the securing piece is substantially parallel to the bottom plate.

9. The mounting apparatus of claim 8, wherein the bracket comprises a first sidewall and a second sidewall substantially perpendicular to the first sidewall, the securing piece is located on the first sidewall, and the securing piece is substantially perpendicular to the first sidewall and the second sidewall.

10. A mounting apparatus comprising:
a chassis comprising a bottom plate;
a first fastener secured to the bottom plate, the first fastener defining a through hole and a positioning slot in an inner wall of the through hole;
a bracket configured for securing PCI cards, a securing piece located on the bracket and placed on the first fastener, a securing hole defined in the securing piece and aligned with the through hole; and
a second fastener comprising a base portion and a blocking portion, the base portion is engaged in the securing hole and the through hole, the securing piece positioned between the blocking portion and the first fastener, and a positioning portion located on the base portion;
wherein the positioning portion is slidable between a first position, where the positioning portion is engaged in the positioning slot for blocking the second fastener from disengaging from the first fastener, and a second position, where the positioning portion is disengaged from the positioning slot for removing the second fastener from the first fastener.

11. The mounting apparatus of claim 10, wherein a receiving hole is defined in the base portion and the positioning portion is moveable in the receiving hole.

12. The mounting apparatus of claim 11, wherein a resilient member is received in the receiving hole, and the resilient member is resiliently deformed when the positioning portion is slid from the second position to the first position and comes back to slide the positioning portion from the first position to the second position.

13. The mounting apparatus of claim 10, wherein a diameter of the blocking portion is greater than that of the securing hole.

14. The mounting apparatus of claim 10, wherein the first fastener defines a recess in a bottom of the through hole.

15. The mounting apparatus of claim 10, wherein the first fastener comprises a head portion, a neck portion and a mounting portion, the neck portion is connected between the head portion and the mounting portion, and the through hole is defined in the head portion.

16. The mounting apparatus of claim 15, wherein a diameter of the neck portion is greater than that of the mounting portion, but less than that of the head portion.

17. The mounting apparatus of claim 15, wherein a fixing member is secured to the bottom plate, the mounting portion is fixed in the fixing member, and a circuit board is mounted between the head portion and the fixing member.

18. The mounting apparatus of claim 10, wherein the securing piece is substantially parallel to the bottom plate.

19. The mounting apparatus of claim 18, wherein the bracket comprises a first sidewall and a second sidewall substantially perpendicular to the first sidewall, the securing piece is located on the first sidewall, and the securing piece is substantially perpendicular to the first sidewall and the second sidewall.

* * * * *